(12) United States Patent
Knowles

(10) Patent No.: US 6,729,316 B1
(45) Date of Patent: May 4, 2004

(54) METHOD AND APPARATUS FOR TREATING CRANKCASE EMISSIONS

(75) Inventor: Desmond Knowles, Orleans (CA)

(73) Assignee: Vortex Automotive Corporation, Gainesville, VA (US)

( * ) Notice: Subject to any disclaimer, the term of this patent is extended or adjusted under 35 U.S.C. 154(b) by 0 days.

(21) Appl. No.: 10/269,664

(22) Filed: Oct. 12, 2002

(51) Int. Cl.⁷ .............................................. H02M 13/00
(52) U.S. Cl. ..................................................... 123/572
(58) Field of Search .......................... 123/572–574, 123/184.21–184.61

(56) References Cited

U.S. PATENT DOCUMENTS

| | | | |
|---|---|---|---|
| 2,064,720 A | | 12/1936 | Balogh |
| 3,547,090 A | | 12/1970 | Seliger |
| 3,834,365 A | | 9/1974 | Ussery |
| 4,089,309 A | | 5/1978 | Bush |
| 4,102,314 A | * | 7/1978 | Sarto .......................... 123/572 |
| 4,167,164 A | | 9/1979 | Bachmann |
| 4,191,140 A | * | 3/1980 | Matsumoto et al. ... 123/184.21 |
| 4,370,971 A | | 2/1983 | Bush |
| 4,409,950 A | | 10/1983 | Goldberg |
| 4,459,966 A | | 7/1984 | Sakano et al. |
| 4,852,526 A | * | 8/1989 | Brown ........................ 123/470 |
| 5,190,018 A | | 3/1993 | Costello et al. |
| 5,429,101 A | | 7/1995 | Uebelhoer et al. |
| 5,450,835 A | | 9/1995 | Wagner |
| 5,471,966 A | | 12/1995 | Feuling |
| 5,479,907 A | | 1/1996 | Walker, Jr. |
| 5,551,409 A | | 9/1996 | Sanders |
| 5,562,087 A | | 10/1996 | Wright |
| 5,564,401 A | | 10/1996 | Dickson |
| 5,611,204 A | * | 3/1997 | Radovanovic et al. ...... 123/574 |

\* cited by examiner

*Primary Examiner*—Marguerite McMahon
(74) *Attorney, Agent, or Firm*—Jason A. Bernstein; Powell, Goldstein, Frazer and Murphy LLP

(57) ABSTRACT

There is described an improved method for treating crankcase emissions from an internal combustion engine, comprising the steps of directing the emissions from the crankcase to an emissions separator, subjecting the emissions in the separator to a series of cleansing operations for removal of contaminants, directing the flow of cleansed emissions through a one way check valve back to the engine for combustion and collecting the separated contaminants for disposal.

9 Claims, 8 Drawing Sheets

US 6,729,316 B1

METHOD AND APPARATUS FOR TREATING CRANKCASE EMISSIONS

FIELD OF THE INVENTION

The present invention relates to an enhanced and self sustaining system for the management of the internal combustion engine's crankcase, crankcase emissions and engine lubricating oil, more particularly a sequential method and apparatus for reducing crankcase operating pressures, removing contaminates from the crankcase, prolonging engine lubricating oil life and cleansing the crankcase emissions flow, including a bi-functional remote collector for residuals storage and maintenance of volumetric efficiency for the inventive apparatus. Additionally, the invention optimally relates to a method and apparatus to evenly distribute the cleansed emission flow to the engine's intake manifold air runners, and a method and apparatus to maintain an operable negative pressure to the PCV system at wide open engine throttle.

BACKGROUND OF THE INVENTION

Historically, engine lubricating oil efficiencies have been bolstered at the production level by the introduction of specific additives to the virgin oil. Engine oil is basically contaminated and degraded by the following: a) engine piston(s) blow-by (undesirable bi-products of engine combustion, a portion of which escapes past the pistons and piston rings into the crankcase) comprising fuel soot, partially burned and unburned fuel, steam and various gases and acids; b) foreign liquids, abrasive silicones (dirt), engine component wear particles and oil oxidation by-products; c) the emulsification of the foreign liquids with chemical elements common to the oil e.g., sulfur combines with liquids and elevated engine temperatures to produce corrosive sulfuric acid. The only form of management afforded to the oil in this hostile environment is the physical inclusion of an oil filter. Although the oil filter is effective in removing solids from the oil, its inability to remove dilutants such as moisture and acids leaves oil vulnerable to viscosity breakdown and eventual loss of lubricity. Further, filters that become plugged with sludge and other solids, force the filter by-pass valve to open, allowing unfiltered oil to circulate to downstream engine components. Thus a primary cycle of undue engine wear and over contamination of oil commences. Problems generated are diverse in nature, however of major concern in this instance is increased cylinder bore and piston ring wear. Consequently, the percentage of piston blow-by increases impacting a heavier than normal contaminant load upon the crankcase oil which accelerates degradation. The problem has now gone full cycle. Crankcase pressures increase accordingly and can force oil past engine gaskets and seals. The condition also facilitates the ejection of oil from the engine crankcase via the aspiration conduit fouling the air cleaner, culminating in elevated carbon monoxide emissions. Also oil is vented along with the contaminated crankcase emission vapours, migrating via the PCV system and engine intake manifold en route to the engine combustion chambers, adversely fouling the combustion process. Again, this results in undue component related wear and a higher percentage of piston blow-by entering the crankcase. Relevant PCV problems will be referred to later in this document. This phenomena continues to compound itself with every engine revolution. Increased fuel consumption; loss of engine power; elevated exhaust emissions and a host of other engine operating problems result. An additional compounding factor is the human element, and is a real world problem, in that many owner/operators do not regularly change their engine oil and filter as per OEM specified. They simply top-up the engine oil, sometimes to excess. Resultant problems are similar in nature to the aforementioned.

It has now been the law for approximately 40 years that crankcase emissions from internal combustion engines must be recirculated back to the engine's air-fuel induction system for recombustion in the piston chambers. The return flow of the emissions is normally through the oil return lines extending between the crankcase and the engine's valve or cam covers, and from the valve or cam covers through an external hose or tube to the engine's intake manifold where the emissions are blended with the air-fuel mixture from the carburetor/fuel injectors (in normally aspirated engines) for delivery to the combustion chambers. A positive crankcase ventilation (PCV) valve controls the flow of crankcase emissions into the fuel-air induction system, normally in response to engine running speeds.

The PCV (Positive Crankcase Ventilation) valve is usually located in one of three engine locations: 1) at the engine crankcase vent in the valve/cam covers; 2) in line with the return conduit; or 3) screwed directly into the engine intake manifold. The valve meters and blends the flow of contaminated crankcase emissions into the engines air/fuel delivery system (intake manifold) in response to existing negative pressures within the manifold at various engine load requirements. The path of the emissions from the crankcase via the PCV valve/system, intake manifold and combustion chamber (where they undergo a change of state) and partially re-enter the crankcase as piston blow-by, is the secondary engine cycle of wear and contamination. The PCV valve is also intended to arrest a dangerous back flow condition to the crankcase that could arise as a result of an engine intake manifold backfire. This could cause a crankcase explosion.

The source and nature of crankcase emissions is well known and need not be discussed in further detail. Suffice is to say that in addition to unburned and partially burned fuel and volatile gases that are desirably recycled for combustion, the emissions also include a number of entrained contaminants that, even if combusted, are harmful to the engine or the environment or both. To the extent that the contaminants are combusted, they are exhausted from the engine as harmful pollutants. On the way in and out of the engines combustion chamber(s) they impair the function of critical engine components including critical emission controls such as the oxygen sensor and catalytic converter (s). To the extent that the contaminants are not combusted, they simply remain in the engine, for example as efficiency destroying combustion chamber deposits, jamming piston rings open, hindering their function or they partially return to the crankcase where they contaminate the oil as previously mentioned. As a consequence, this culminates in a loss of lubricating efficiency, sludge build-ups and a host of other problems that degrade engine performance, increase fuel consumption, elevate exhaust emissions and shorten engine life. These problems increase cumulatively over time and are the result of the second cycle of wear and contamination originating within the engine crankcase. The first cycle exiting the crankcase via the oil filter by-pass valve and, the second exiting via the Crankcase vent and PCV valve/system.

Prior art inventions involving superseded carburetted engines have made a variety of attempts to recycle combustible volatile matter in crankcase emissions through insertion of various PCV system filtering devices, without also recycling the entrained contaminants. Varying degrees of success were achieved in this theatre of operations. However, due to their disposition between the PCV valve and the engine intake manifold, many of these inventions have been impractical and commercially unsuccessful. This was due primarily to imbalances that arose to the design calibrations of the intake manifold (air/fuel induction system) by their devices. This had the adverse affect of increasing the cubic capacity of the manifold, externally, which subsequently generated imbalances to the air/fuel ratios, of which the manifold is synergistic. As a consequence, either fuel efficiency or exhaust emissions or both were compromised. As previously stated, some devices attained limited success on older generation carburetted engines, and the technology of the day utilized in the static measurement of such fuel efficiency and exhaust emissions supported this. However, in today's high-tech world and with the availability of vastly advanced and sophisticated test models, procedures and measuring equipment e.g., Environmental Protection Agency and the Federal Test Procedure (EPA/FTP), which subjects the engine to a variety of driving and load conditions on a chassis dynamometer for testing, and is the only full and acceptable standard for measuring true engine performance in relation to the subject matter, indicate otherwise. Further, when attempts have been made to apply this class of older technology to 'state of the art' modem day computer controlled engines, they have been found to compromise OEM related fuel and exhaust emission efficiencies. The engine's oxygen sensor, located in the exhaust manifold, detects the additional air from the prior art devices and consequently additional fuel is injected into the intake manifold to counter the imbalance.

For example, Bush in U.S. Pat. No. 4,089,309, describes an open crankcase emission device that requires the use of an auxiliary air intake structure 43 that draws outside ambient air into the device for initial cooling of crankcase emissions. This introduces uncalibrated oxygen into the PCV system which, as previously indicated, is detected by the oxygen sensor utilized in today's computerized engine management systems and causes the system to inject fuel that is surplus to requirement. Bush, in a later U.S. Pat. No. 4,370,971, abandons the previous system configuration in favour of repositioning the system between the PCV valve 27 and the intake manifold entry port 36. In doing so, Bush not only retains the auxiliary air intake structure 69 with attendant problems but also subjects the whole configuration to a negative pressure environment. This, claims Bush, relates to improvements in the control of crankcase emissions, without due concern to the detrimental affects on the intake manifold design and operation. Specifically, Bush's later configuration is now in direct communication with the interior of the engine intake manifold and unbalances the manifold calibrations by externally increasing its cubic capacity. This avails additional oxygen to and unbalances the stoichiometric air/fuel mixture within the manifold. Again, this condition is detected by the engine's oxygen sensor, and further confuses the computer which can only respond by injecting additional fuel to counter the imbalance. Even therefore if Bush removed and plugged the auxiliary air intake structure 69 to accommodate modern-day engines, his system's disposition would still fail it.

A similar approach is taught by Costello in U.S. Pat. No. 5,190,018 to that of Bush in U.S. Pat. No. 4,370,971. Costello's device is similar in structure, operation and disposition to that of Bush, with all the attendant disadvantages, including creating an uncalibrated increase in the volume of the engine's intake manifold.

SUMMARY OF THE INVENTION

A self sustaining crankcase management system capable of removing contaminants from the crankcase, crankcase emissions and engine lubricating oil is important to maintaining and protecting OEM component and oil manufactures design efficiencies. These corrective steps help preserve and prolonged fuel efficiency, overall engine performance and exhaust emission standards. The contaminant removal steps reduce the presence of foreign liquids, reduce the formation of residual corrosives and negate the existence of constituents to sludge buildup. The process would further mitigate the existence of the primary and secondary cycles of wear and contamination and allow uncombusted volatiles and ketones to migrate beyond the crankcase management system to the engine combustion chamber(s) via the PCV system and intake manifold.

It is therefore an object of the invention to provide a supplementary crankcase vessel having an internal crankcase emissions separator that obviates and mitigates from the disadvantages of the prior art.

It is a further object of the present invention to provide a supplementary crankcase vessel that reduces and equalizes the operating pressure of the crankcase thereby maximizing the uninhibited removal of crankcase contaminants and emissions from the crankcase. It is a further object of the present invention to provide a supplementary crankcase vessel and separator which is invisible to the engine's computer management system and which does not disrupt the design calibrations of the engine's intake manifold or stoichiometric air/fuel ratios.

It is a further object of the present invention to optionally provide a remote bi-functional vessel to collect liquid and solid residuals draining from supplementary crankcase vessel and its separator to sustain their design efficiencies.

It is a further object of the present invention to provide the aforementioned apparatus that operates under the influences of positive rather than negative pressures.

It is a further object of the present invention to provide optional apparatus which will provide an operable negative pressure to the engine PCV system at wide open throttle condition. This previously has not been an OEM engine design feature.

It is a further object of the present invention to provide optional apparatus to the engine PCV system for even distribution of cleansed crankcase emissions to individual air runners of the intake manifold.

It is a further object of the present invention in a preferred embodiment that it be adaptable to internal combustion engines that consume gasoline, diesel, compressed natural gas (CNG), propane (LPG), ethanol, methanol and all other forms of fuels. Moreover, the broad principles of the invention can be applied to the separator of contaminants from bulk fluids such as, for example, the removal of water from compressed natural gas.

It is a further object of the present invention to provide the aforementioned apparatus that is economical to produce and install either as original equipment or as an after market addition, and which is easily and readily serviceable.

According to the present invention then, there is provided a method of treating crankcase emissions from an internal combustion engine, comprising the steps of directing emissions from said crankcase to an emissions separator; subjecting the emissions flowing through said separator to a cleansing operation for removal of contaminants; directing the flow of cleansed emissions through one way check valve means back to the engine for combustion; and collecting the separated contaminants for disposal.

According to the present invention, there is also provided an apparatus for treating crankcase emissions from an internal combustion engine, comprising a first housing having an inlet for the inflow of crankcase emissions, an outlet for the return flow of treated emissions to the engine for combustion therein and drain means for drainage of contaminants separated out from said crankcase emissions; a second housing disposed in said first housing, said second housing including an inlet in fluid communication with said inlet in said first housing, and an outlet in fluid communication with both said outlet and said drain means in said first housing; and treatment means disposed in said second housing for subjecting the crankcase emissions flowing therethrough to cleaning operations for separation of contaminants from said emissions.

BRIEF DESCRIPTION OF THE DRAWINGS

Preferred embodiments of the present invention will now be described in greater detail and will be better understood when read in conjunction with the following drawings in which.

DETAILED DESCRIPTION

Figure 1:
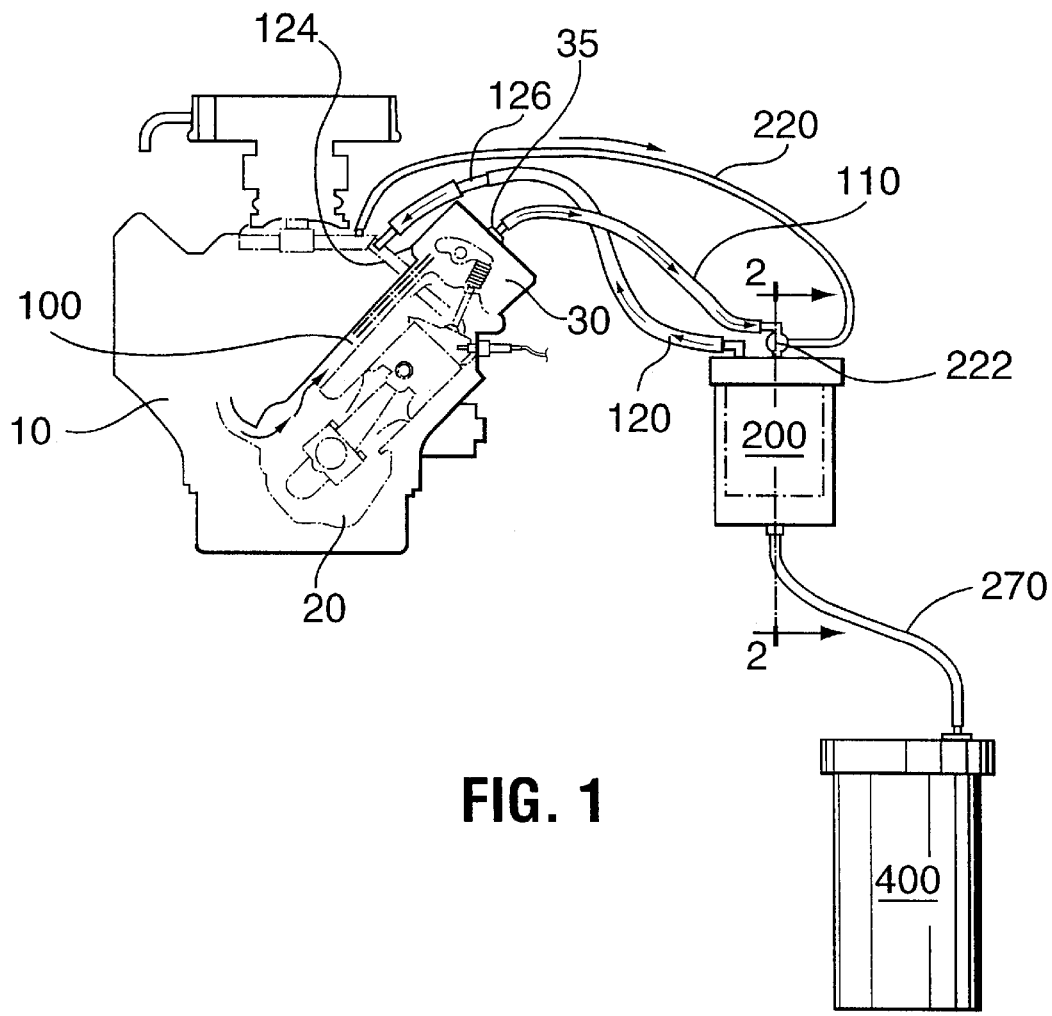
FIG. 1 is a diagrammatic representation of an internal combustion engine including the present separator.

With reference to FIG. 1, there is shown a conventional engine layout coupled to the present separator 200 used for separating crankcase emissions into liquid, solid and gaseous fractions and for collecting the non-gaseous fractions while recycling the gaseous fractions. The engine shown is a relatively low tech push rod, carbureted engine, still in common use particularly in fleet vehicles. The present invention however is equally suited for use with more modern fuel injected, overhead cam, computer managed engines.

Throughout the drawings, like numerals have been used to identify like elements.

As shown, engine 10 includes a crankcase 20, an oil return line 100 that channels crankcase emissions to the interior of a valve cover 30 and a connector 35 on the valve cover for a conduit 110 that directs the emissions to separator 200.

The emissions are forced by positive pressure in the crankcase into conduit 110. This conduit preferably has an enlarged inner diameter (I.D.) for maximum non-restrictive fluid flow to the inlet of separator 200. The use of conventional conduits having a smaller I.D. would preclude achieving a preferred high volume emissions flow and could constitute a restricted, less voluminous flow. The second enlarged I.D. conduit 120 is a return conduit for cleansed emissions. A third and smaller optional conduit 220 transfers filtered, pre-calibrated cooler non-ambient air, selectively sourced downstream from the throttle valve/valves, to an aerodynamically designed vortex generator and diffuser 222. Conduit 220 may alternatively draw air upstream of the throttle valve/valves and downstream of the mass air-flow sensor when one is present.

In the following description, separator 200 is described as being mounted externally of the engine and in communication with the engine's crankcase through a connector in a valve cover. It is contemplated however that the separator could be internally installed, such as within the valve cover itself, and communication with the crankcase could be provided by a different connection point for example a dedicated check valve or coupling on the engine block. It is further contemplated that the separator could be constructed as an integral engine component or subsystem.

Figure 2:
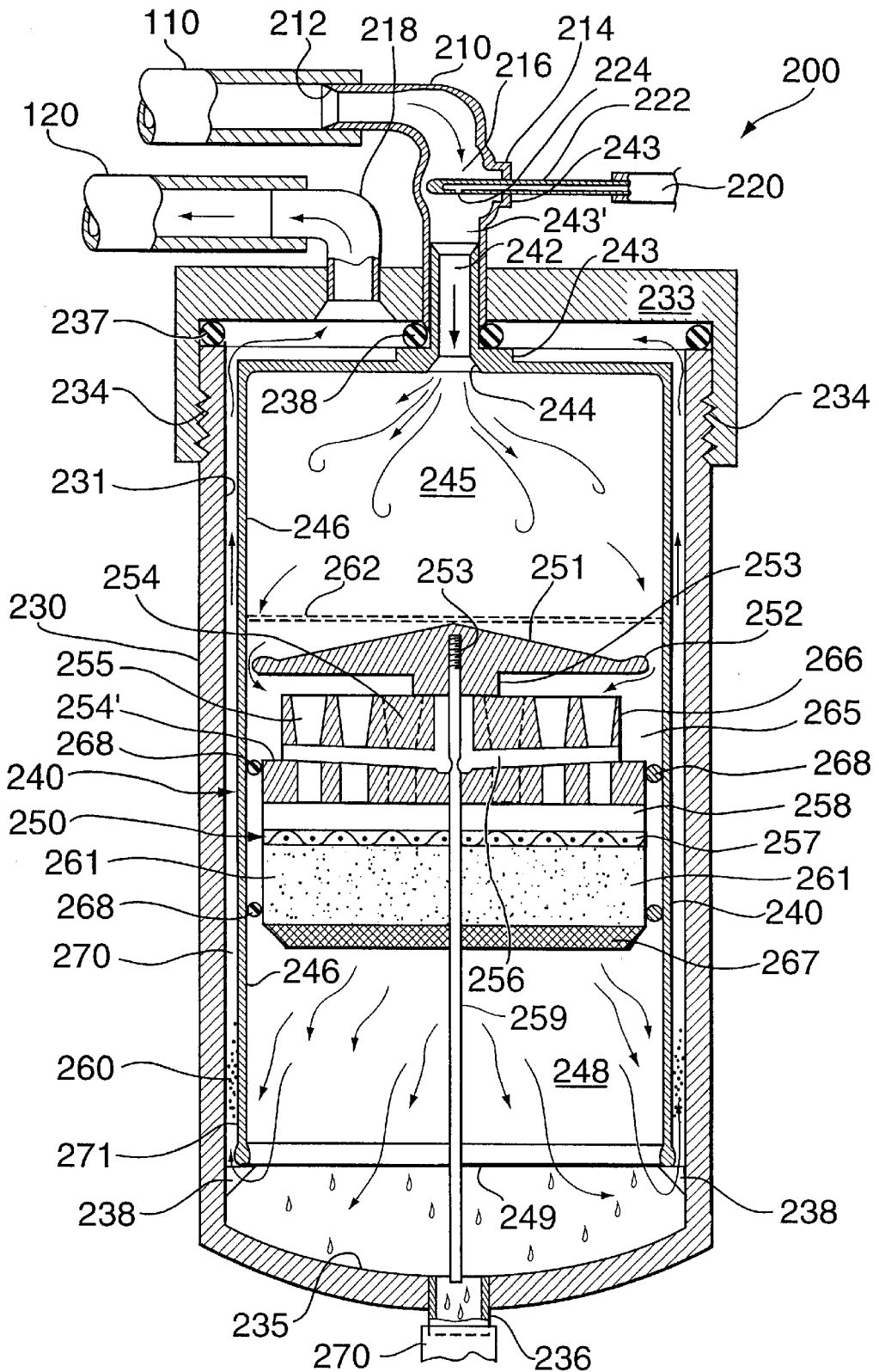
FIG. 2 is a side elevational cross sectional view of the separator.

The separator 200 of the present invention is shown in greater detail in FIG. 2 and includes a main housing 230 and a cartridge 240 therein which preferably is consumable and replaceable. A closure cap 233 is secured to the open top of main housing 230 by means of threads 234. O-rings 237 and 238 provide sealing between housing 230 and cap 233 and between shoulder 243 on cartridge 240 and the cap, respectively.

Entering the closure cap 233 is a direction adjustable, radiused right angle inlet port 210 with a concave venturi 212 for receiving crankcase emissions. In one embodiment constructed by the applicant, the inlet port 210 defines a diffusion chamber 216 intermediately downstream of its inlet. This diffusion chamber 216 can include a port 214 for the insertion and placement of a diffuser 222. The diffuser includes an outlet 224 that allows filtered, cooler non-ambient calibrated air from conduit 220 to admix with the crankcase emissions as they flows past into cartridge 240. An exit port 218 through cap 233, similar in configuration to inlet port 210, permits cleansed portions of the emissions flow to be directed back to the intake manifold of the engine via conduit 120 and one way PCV check valve 126 seen most clearly in FIG. 1.

Main housing 230 advantageously includes at its lower-most end a concave floor 235 which communicates with an exit drain 236 leading to a collection vessel 400. Inner wall 231 of main housing 230 includes a plurality of support brackets 238 for cartridge 240. The brackets are spaced equidistantly about interior wall to support the cartridge above floor 235. Main housing 230 may be optionally elongated to compensate for the absence of a drainage collector and/or drainage service unit as will be described below.

Cartridge 240 separates/fractionates the incoming crankcase emissions into liquid, solid and gaseous portions, the liquid and solid portions being decelerated, condensed and separated both in the cartridge and in a cassette 250 within cartridge 240 and then drained away. Cleansed fractionated emissions are meanwhile permitted to flow toward exit port 218 for exit from the housing via enlarged conduit 120. As will be apparent, vacuum produced in the intake manifold when the engine is operating, coupled with positive pressure in the crankcase, causes the crankcase emissions to be forced into separator 200. Venturi 212 formed in inlet port 210 accelerates the flow of emissions received from conduit 110. Inlet venturi 212 also assists in maximizing the flow of crankcase emissions from the crankcase through conduit 110, due to a slight drop in temperature of the emissions as they pass through the venturi.

As the emissions flow through inlet port 210, they then pass into diffusion chamber 216. Disposed in this chamber is the external, non-ambient air diffuser 222 with outlet 224. Diffuser 222 is located centrally in chamber 216 to ensure that the calibrated non-ambient air from outlet 224 is introduced centrally into the emissions flow, rather than permitting this air to flow down the wall of the cartridge inlet conduit 242. To enhance this function, diffuser outlet 224 is centrally located in the diffuser's lower surface where it comprises a minute orifice. This specific positioning in conjunction with turbulent vortices generated downstream of the diffuser enhances the oxidization and condensation of the emissions. Diffuser 222 is triangular in transverse cross-sectional shape, with its apex pointed up into the laminar flow of entering emissions. Laminar flow of emissions passing around the diffuser will break up on both sides of the diffuser, generating downstream turbulence and probably inter-molecular collisions. Therefore greater kinetic energy is produced via these generated turbulent vortices, to enhance cooling of the emissions flow. As a result, heavy hydrocarbon and foreign matter emissions are reduced to a liquid state, and pass through vortex generator 244 to an expansion chamber 245 in cartridge 240.

Conduit 242 connects an upper venturi 243' with vortex generator nozzle 244. Emissions passing through conduit 242 are reaccelerated, straightened and marginally cooled. Vortex generator nozzle 244 produces large turbulent flow vortices within the emissions flow entering primary expansion chamber 245, enhancing kinetic energy within the emissions flow.

Within separator 200 there are three expansion chambers: two within cartridge 240, namely chambers 245 and 248; and one 258 within the removable cassette 250 that fits concentrically into cartridge 240 and which will be described in greater detail below. The number of chambers may however vary up or down and there is described below an embodiment having four such expansion zones.

Primary expansion chamber 245 is bounded on its sides and upper surface by the surrounding walls 246 of cartridge 240 and on its lower surface by a solid circular conic baffle 251. Baffle 251 is the uppermost component of cassette 250 and is connected to the cassette by means of a threaded connection 253 to a drain tube 259 that passes axially through the cassette's centre and acts as a spine interconnecting the cassette's components. The baffle generates reverse vortex motion back into the incoming emission vortices generated by vortex generator nozzle 244. This results in a first-stage separation of the emissions flow wherein undesirable heavy hydrocarbons and foreign matter are removed from the emissions flow by, it is believed, enhanced sidewall impingement and the condensing effect of inter-molecular collisions within the generated turbulent vortices. Baffle 251 also serves to protect the cassette's downstream components from direct and excessive contamination by the turbulent emissions flow entering chamber 245.

Figure 3:
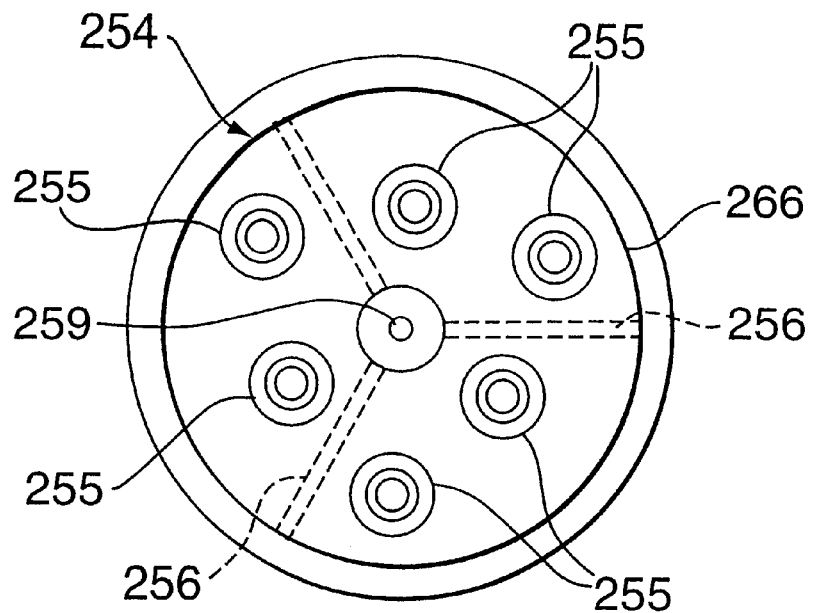
FIG. 3 is a top plan view of a velocity stack compression head forming part of the separator.

Condensates tend to form in oil and moisture droplets of water, fuel, coolant,/anti-freeze, tar, varnishes and other crankcase contaminants that drain down cartridge wall 246 and over the lip 252 of baffle 251 to collect in the annular space 265 beneath the baffle and between the cartridge wall 246 and the opposed wall 266 of the cassette. Further downward drainage is prevented by O-ring's 268 that seals between the cartridge and the cassette. Fluid that collects in this area flows into concentric drain tube 259 via 2 or 3 radial drain lines 256 that open at one end through cassette wall 266 and at the other end into the drain tube. The placement of the radial drain lines can most easily be seen from FIG. 3 which is a plan view of the cassette's upper surface immediately below the baffle. The drain tube itself directs the condensates to the bottom of the cartridge and from there the residuals flow through drain 236 into a collector 400 (FIG. 1).

There follows a more detailed description of the elements comprising the consumable/disposable cassette 250.

The basic elements of cassette 250 comprise, from top to bottom, baffle 251, a venturied velocity stack compression head 254, expansion chamber 258, wire mesh screen 257, gas deceleration and condensation element 261, and exhaust skirt 267.

Residual liquids condensed in expansion chamber 245 are, as aforesaid, drained away through lines 256 and 259 and therefore effectively by-pass the cassette, preventing it from becoming overly gummed up.

Compression head 254 is situated beneath baffle 251 and is separated from the baffle by a shoulder 253 on the baffle's lower surface. The expanded emissions from chamber 245 flow into this space and into a plurality of velocity stacks 255 formed through the compression head. The placement of these stacks is best seen from FIG. 3 where it will be seen that they are arranged to avoid interference with radial drains 256. The velocity stacks themselves are substantially funnel-shaped to compress the remaining emissions flow. The emissions emerging from the stacks are then expanded somewhat into expansion chamber 258 before flowing through wire mesh matrix screen 257 located above deceleration and condensation element 261. The screen provides a supplemental emissions impingement surface for additional condensation of residuals.

Deceleration and condensation element 261 advantageously comprises a primary packing of inert particles such as glass beads, each being 3–4 mils in diameter. Preferably as well, a secondary packing of smaller diameter glass beads, by comparison 2–3 mils in diameter, interfaces with the primary packing to further decelerate and condense undesirable heavy hydrocarbons and foreign matter from the flow. The beads can be perforated and other particulates, or fibres, can be used. This step is preparatory to the light hydrocarbons and volatiles being fractionated from the heavy hydrocarbons and foreign matter as the emissions emerge into succeeding expansion chamber 248. By whatever process is involved, it has been found that the passage of the emissions through the glass beads results in significant additional separation of undesirable liquid and solid fractions that drain through wire mesh exhaust skirt 267 for eventual discharge into collector 400. It is possible that the impingement of the emissions against the beads generates greater entrainment of the liquid fractions, separating these fractions from the vapour stage by deceleration and condensation.

Packing 261 can also act as a flame arrester in the event of an engine backfire through the intake manifold.

Cassette 250 terminates at exhaust skirt 267 which confines the glass beads within the packing.

The remaining emissions flow from the packing enters expansion chamber 248 where some additional condensation of heavier residuals can occur, particularly as the emissions impinge against cartridge wall 246. These residuals also drain through the open lower end 249 of the cartridge for discharge into collector 400.

In operation contaminates are transferred to gravity collector 400 through drain 236 of main housing 230 and the remaining gaseous emissions flow travels around cartridge terminus 249 and upward between inner wall 231 of main housing 230 and the outside wall of cartridge 240. Travel of the emissions through this annulus 270 provides yet another opportunity for condensation of undesirable residuals that flow back down the annulus to the bottom of the separator for drainage.

Figure 4:
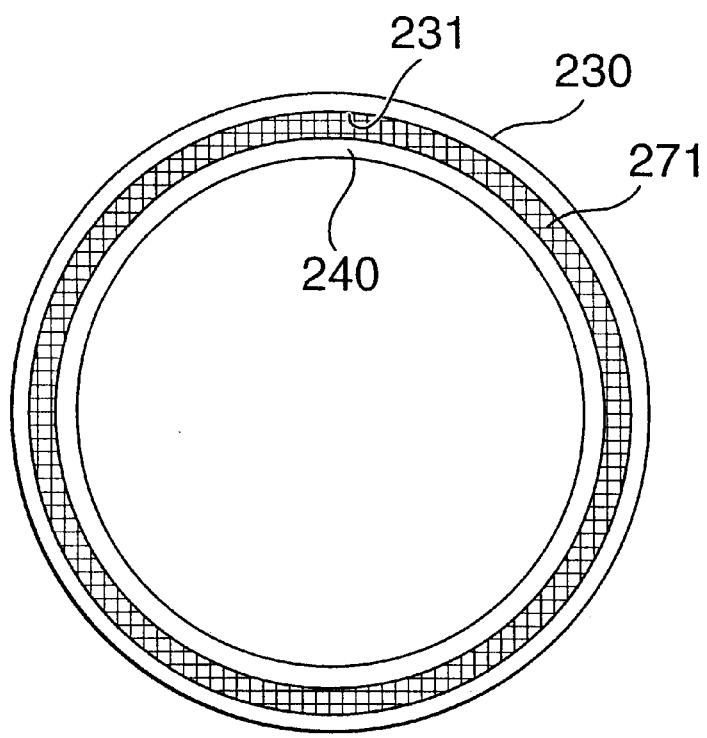
FIG. 4 is a plan view of an annular screen forming part of the separator.

In one preferred embodiment constructed by the applicant, the lower end of annulus 270 is provided with a screen 271 (FIG. 4) so that the annular space above the screen can be filled or partially filled with additional glass beads 260. These beads can rise or fall in the annulus depending upon the level of suction induced by the engine's intake manifold acting through conduit 120. This can maximize the exposure of their surface area to the emissions for a final cleansing impingement.

The cleansed emissions exit separator 200 via exit port 218 and conduit 120 to the engine intake manifold 124 after passing through PCV valve 126.

Within the entire assembly represented by the main housing 230, a vaporization effect of remaining volatiles is believed to take place. This thermal vaporization is due to the insulating characteristic of the main housing 230, relative to encased inner cartridge 240 and cassette assembly 250. Heat is derived from the convectional flow of hot engine crankcase emissions throughout the assembly. From this convectional flow, heat is absorbed via conduction of all exposed interior surfaces. This absorbed or conducted heat facilitates, through radiation, the vaporization of volatiles contained within the heavy hydrocarbons.

As is known, vacuum diminishes within an engine's intake manifold at high engine speeds, particularly at wide open throttle (WOT). At the same time, excess pressures will build up within the crankcase, due to the high speed pumping action of the pistons. Nonetheless, these pressures must somehow be vented and permitted to escape. Otherwise piston blowby pressures will back up through the crankcase aspiration conduit into the air cleaner, or air duct, thus contaminating the air filter and/or downstream components. In some cases, this condition creates a problem which causes excessively rich mixtures, ultimately leading to the production of undesirable tail pipe emissions. In addition, a further effect of non-aspiration of the crankcase by cooler ambient air is engine and engine lubrication heat stress. To date these problems have posed difficult solutions to engine design and operation. There will now be described a method and apparatus for negative pressure generation in the engine intake manifold irrespective of throttle opening.

Figure 5:
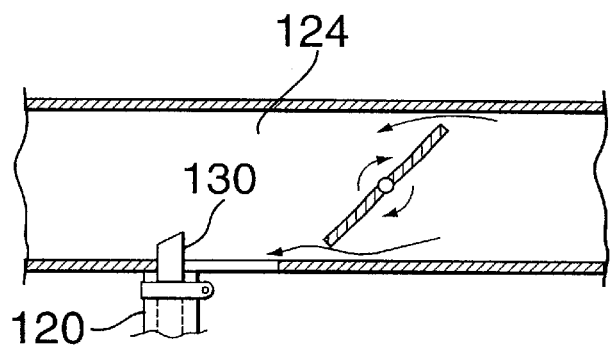
FIG. 5 is a diagrammatic view of a negative pressure generator located in an intake runner.
Figure 6:
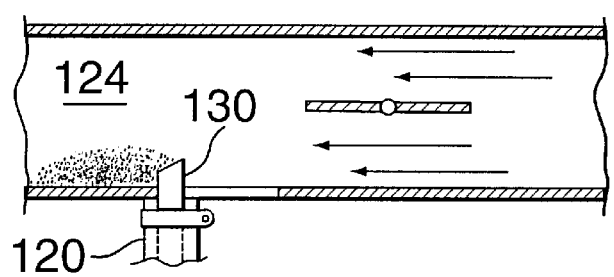
FIG. 6 shows the same intake runner at wide open throttle.

FIG. 5 depicts a normal high vacuum condition in the intake manifold at partially open throttle. As the throttle progressively opens as shown in FIG. 6, vacuum diminishes, affecting the operational efficiency of the PCV system. To overcome this problem, a negative pressure generator 130 is introduced to the interior of the intake manifold. This generator, which is the outlet into the intake manifold for the cleansed emissions delivered through conduit 120 from separator 200, produces a venturi effect at the high dynamic flow rates prevailing at open throttle settings, creating in effect a vacuum in its own wake. This draws in the cleansed emissions to maintain operation of the PCV system and ambient air-flow throughout the engine crankcase at high engine speeds. This negative pressure generating function is largely inoperative and unneeded when vacuum exists in the intake manifold at lower throttle settings. The resultant function of maintained crankcase aspiration assists in cooling and preserving crankcase lubricants and engine components under extreme operating load conditions.

Figure 7:
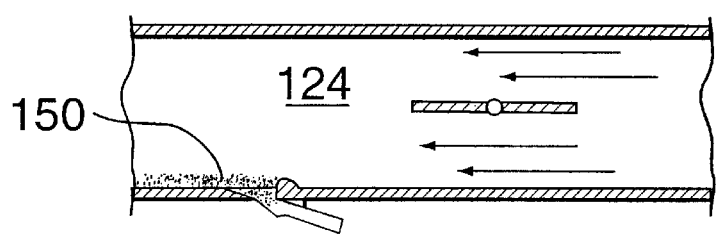
FIGS. 7 to 9 are diagrammatic views of alternative negative pressure generators.
Figure 8:
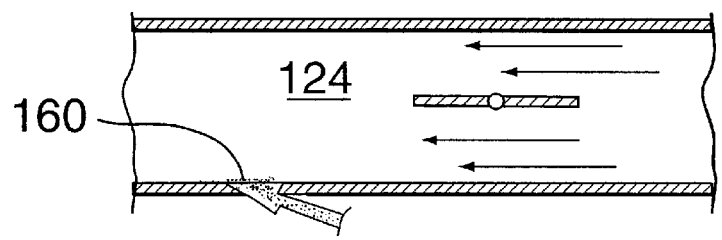
Figure 9:
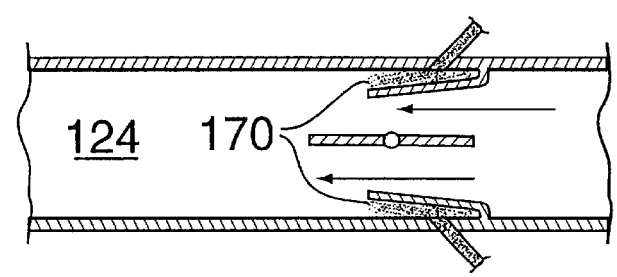

Alternative negative pressure generators 150, 160 and 170 are shown in FIGS. 7, 8 and 9 respectively, and their operation will be apparent to those skilled in the art without further detailed explanation.

As will be apparent, the separation and collection method and apparatus described above will function independently of the use of the negative pressure generators shown and described with reference to FIGS. 5 and 9.

Figure 10:
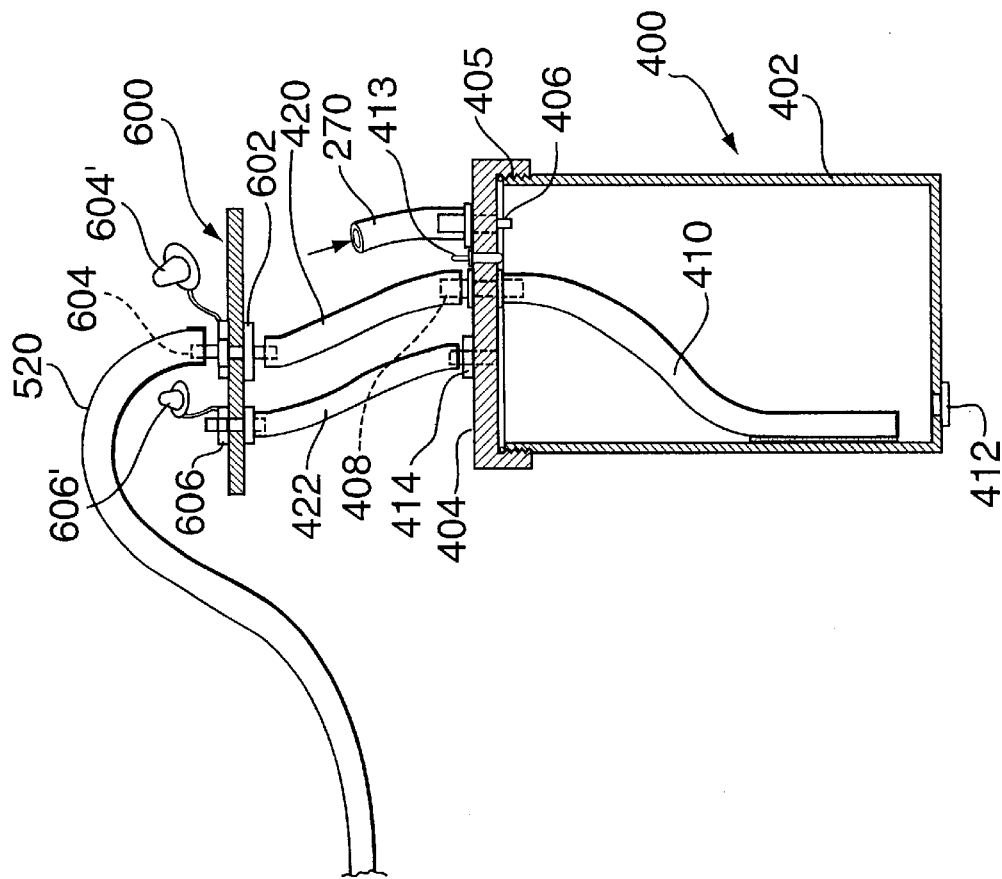
FIG. 10 is a side-elevational partially cross-sectional view of a gravity collector for materials drained from the separator of FIG. 2.

FIG. 10 depicts the details of gravity collector 400. It is connected to drain 236 of main housing 230 by means of conduit 270 for collection and storage of removed contaminants. The gravity collector 400 has an optional drainage service unit 500 (FIG. 11) which may also be installed.

The function of collector 400 is not only to receive residuals from separator 200, but also to maintain pressure reduction and pressure equalization with the engine's crankcase. It comprises a main housing 402 and a housing closure 404 threaded thereto. O-ring 405 seals the housing and cap together. The collector may be disposed horizontally or vertically in the engine compartment, alongside the crankcase, sub-frame or wherever space permits at an elevation below drain 236. Both inlet 406 and outlet 408 are offset from the center of the cap to facilitate access and ease of installation of conduits 270 and 420 respectively in the cramped quarters of the engine compartment and/or vehicle chassis. Inlet nipple 406 protrudes inwardly into the container chamber. It is of enlarged diameter, relative to outlet 408. Scavenge line 410 is open-ended permitting access to residuals, should the collector 400 be set horizontally. Gravity drain plug 412 is set on the bottom, adjacent the scavenge line 410. Fluid level sensor 413 is set within cap 404, whereupon it may correctly gauge the fluid level whether the collector is set vertically or horizontally. Conduit 420 being interconnected to scavenger line 410 via outlet nipple 408 leads scavenged residuals from the collector 400 to interconnecting nipple 604 of coupler 600.

The gravity collector 400 is provided with an ambient air vent conduit 422 originating on coupler 600 at the ambient air vent nipple 606. The nipple has a vent nipple cap 606'. In the collector housing cap 404, the vent conduit 422 terminates in the cap at vent nipple 414.

Connecting the collector 400 to portable drainage service unit 500 is a check valve coupler 600. This coupler is positioned on a header panel at the front of the engine compartment or wall bracket and is provided with nipples 602–604. The former, nipple 602, services conduit 420 from collector 400 and the latter, nipple 604, connects conduit 520 to the succeeding drainage service unit 500.

Figure 11:
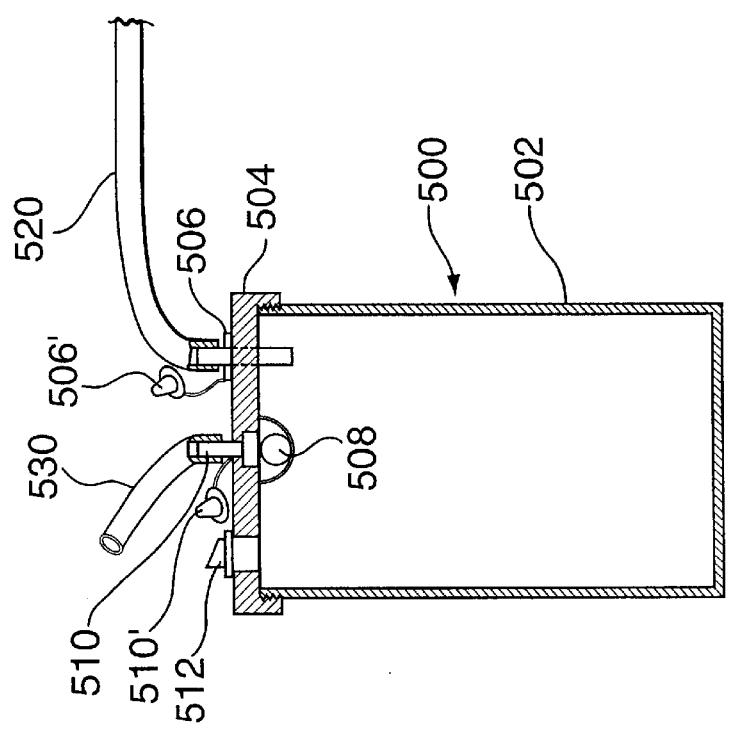
FIG. 11 is a side-elevational partially cross-sectional view of a service unit for draining the collector of FIG. 10.

With reference to FIG. 11, the housing 502 of service unit 500 is provided with a hermetically sealed cap 504 which contains a check valve 508 and a vacuum source nipple 510, said nipple having a dust cap 510'. Element 512 comprises a retractable dump spout which is self-sealing under the influence of negative pressure. Inlet nipple 506 of drainage service unit 500 is interconnected via conduit 520 to nipple 604 of coupler 600. Outlet nipple 510 of drainage service unit 500 is interconnected via conduit 530 to a preselected vacuum source at the engine intake manifold to periodically empty collector 400.

The basic method and apparatus herein may function independently of the drainage service unit 500. Its inclusion is optional.

Such a drainage service unit might not be adapted to diesel engines as most lack an engine vacuum source but the collector 400 may be drained to the same effect.

Reference will now be made to FIGS. 12 to 17 showing the preferred embodiment of the present separator which is somewhat simplified in construction for more efficient manufacturing, particularly if the unit is to be made from plastics. This embodiment is, in its main features, the same as the embodiment described above with reference to FIGS. 1 to 4 with the principle exception being that cassette 250 is eliminated as a discrete element and is instead integrated into cartridge 240 for a more economical and simplified construction. The following description is therefore limited to the more significant differences between the two embodiments.

Figure 12:
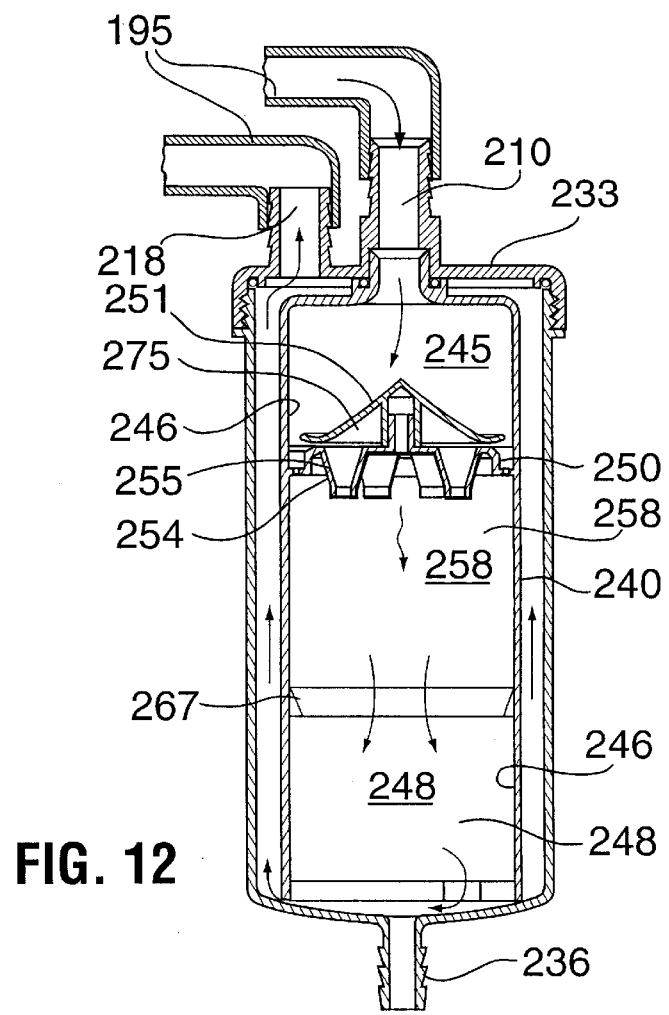
FIG. 12 is a side-elevational cross-sectional view of a modified separator.
Figure 13:
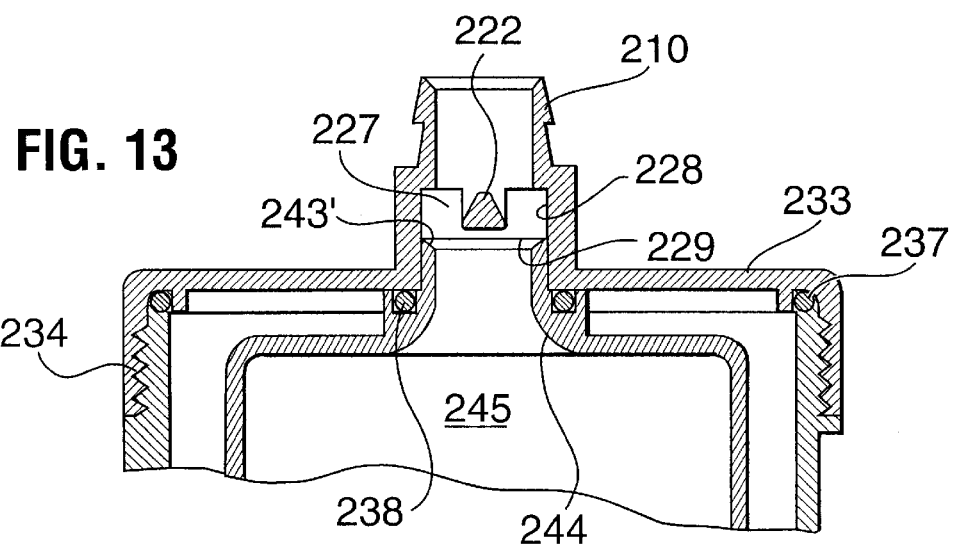
FIG. 13 is a side-elevational cross-sectional view of the upper portion of the separator of FIG. 12.

As will be seen particularly from FIG. 12, inlet port 210 and exit port 218 are straight, lacking the integrated elbows in the inlet and exit ports of the separator shown in FIG. 2. Rather, relatively inexpensive radiused elbows 195 can be used that can be either friction fit or clamped to the ridged outer surfaces of ports 210 and 218. This also allows the elbows to be turned in the direction of conduits 110 and 120 to minimize unnecessary bends and crimps in these lines. The inlet port may still enclose a diffuser 222 as best seen in FIG. 13, the diffuser being supported in a cradle 227 located in the widened throat 228 of inlet 210. The lower edge 229 of the cradle is camphered to nest into the correspondingly camphered upper venturi 243'. Diffuser 222, if present, provides the same function as described above although in this embodiment, the diffuser is not adapted to discharge calibrated air from the intake manifold into the emissions flow. The triangular diffuser therefore merely generates turbulence. If such air is to be introduced into the emissions flow, the diffuser described above including outlet 224 can be substituted.

As described previously, the lower surface of expansion chamber 245 is bounded by a conic baffle 251. In this embodiment, the baffle shown most clearly in FIG. 14, displays greater pitch along its sloped sides and is connected to the compression head 254 itself by a snap fit between sleeve 248 on the baffles' lower side and a circular stem 249 extending upwardly from the head's upper surface.

The purpose of the baffle is to generate reverse vortices back into expansion chamber 245 to promote condensation of liquid contaminants via collision. The condensates drain down inner walls 246, past the baffle's lip 252 and into the annular space 265 beneath the baffle and between cartridge wall 246 and the opposed shoulder 266 of compression head 254. In this embodiment however, O-ring's 268 are eliminated and instead, wall 266 is extended to include a lower surface 266' so that annular space 265 is now a self-contained trough extending completely around the upper periphery of the compression head. Whereas in the previously described embodiment, fluid from this space drained into a drain tube 259 via radial drain lines 256, drainage has been considerably simplified in this embodiment by forming two or three small holes 264 seen best in FIG. 15 in the trough's lower surface which allows the condensates to continue draining down the inner walls 246 of cartridge 240 towards drain 236. In this way, radial drains 256 and drain tube 259 can be eliminated.

Figure 14:
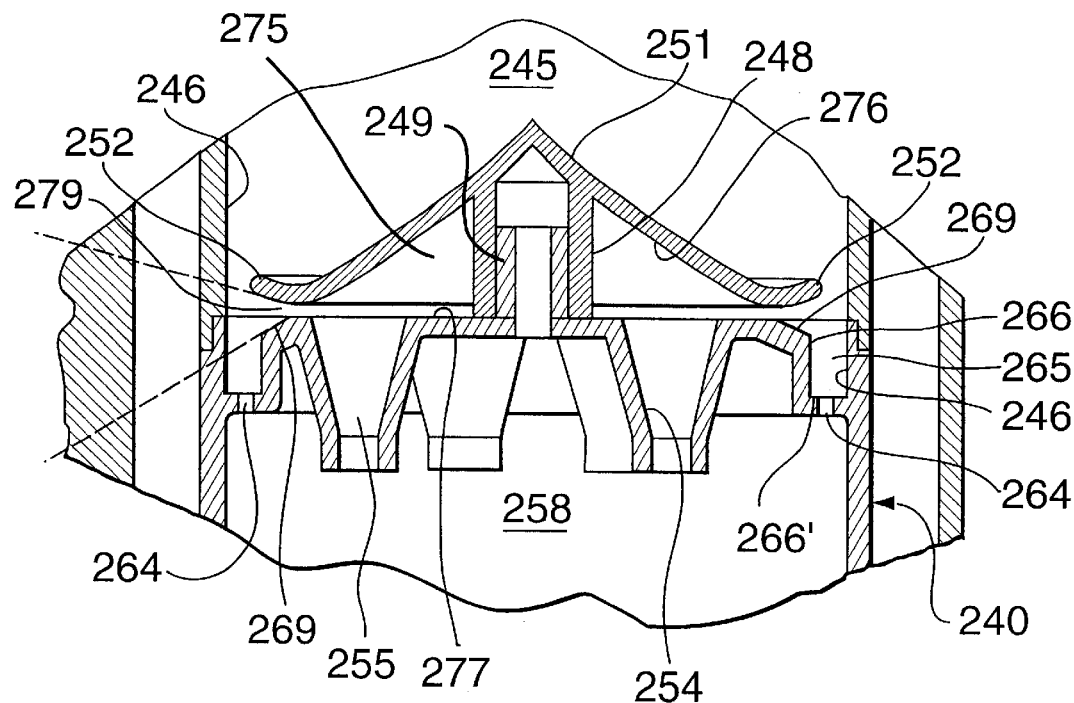
FIG. 14 is a side-elevational cross-sectional view of the mid-portion of the separator of FIG. 12.
Figure 15:
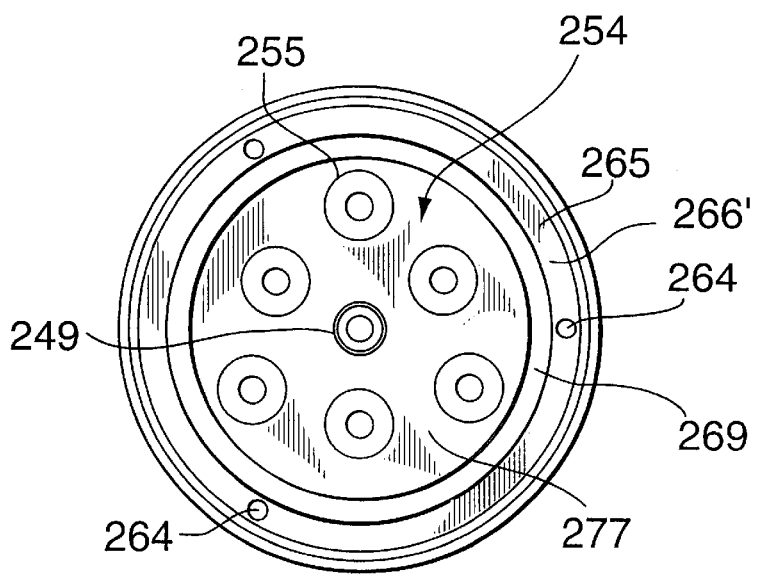
FIG. 15 is a top plan view of the velocity stack compression head forming part of the separator of FIG. 12.
Figure 16:
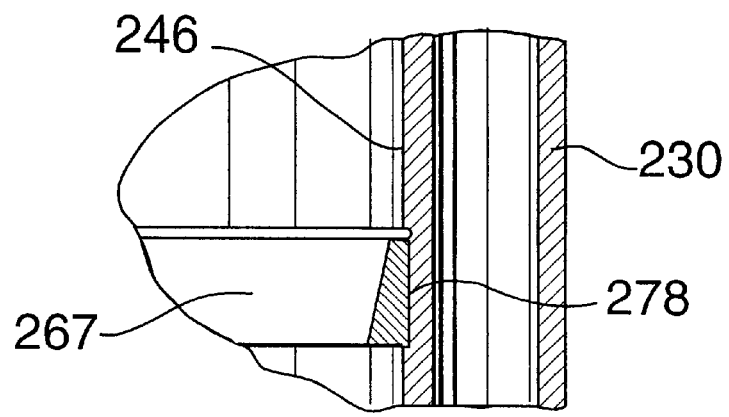
FIG. 16 is a side-elevational cross-sectional enlargement of part of the separator FIG. 12.

The top of wall 266 is bevelled as shown at 269 which, in co-operation with the upward flare of lip 252 on baffle 251, provides a peripherally extending conically-shaped opening or venturi 279, shown diagrammatically in FIG. 14 by broken lines, into an expansion area or chamber 275 between the baffle's lower surface 276 and an upper surface 277 of compression head 254. There is believed to be an acceleration, and a concurrent cooling, of the emissions through opening 279 and then an expansion of the flow into chamber 275 in which, at least ideally, an equal and steady pressure is maintained over velocity stacks 255. The emissions flow is then once again compressed and accelerated as it is forced through the velocity stacks 255 into expansion chamber 258. This rapid series of compressions, expansions and accelerations is believed to promote separation of contaminants, particularly as liquid discharge from the velocity stacks into chamber 258 can sometimes be observed.

The function of the elements previously part of cassette 250 is substantially the same as described above with the exception that the entire internal volume of the space 258 between skirt 267 and velocity stack compression head 254 is occupied by the packing of inert articles such as glass beads. Compression head 254 is now an integrated part of the cartridge 240 as seen most clearly from FIG. 14, and skirt 267 snap fits into a circumferential notch or detente 278 formed into cartridge wall 246 as shown most clearly in FIG. 16. The beads can grade in size from 2 to 4 mls and can be inter-mixed or layered with the larger particles at the top. Advantageously, the beads can be perforated or made hollow to increase their surface area for purposes of more graduated deceleration of the heavy hydrocarbon and foreign liquids and solids in the emissions flow.

When the packing fouls to the point of ineffectiveness, the entire cartridge 240 can be removed and disposed of and a fresh cartridge is installed in its place. In this embodiment, there are four expansion chambers, numbers 245, 275, 258 and 248 proceeding from top to bottom.

Figure 17:
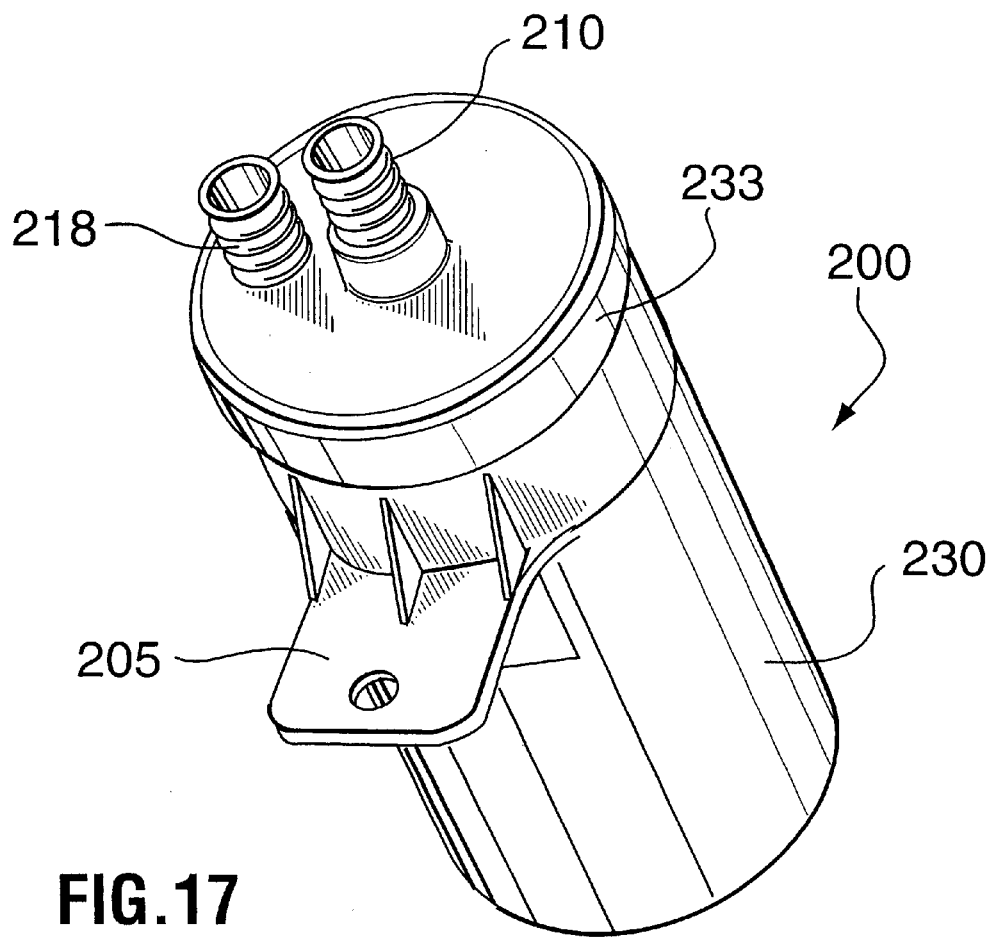
FIG. 17 is an upper perspective view of the exterior of the separator of FIG. 12.

FIG. 17 is a perspective view of separator 200's exterior including a bracket 205 useful to mount the separator at a convenient location in the vehicle's engine compartment.

Using the above described method and apparatus, one scavenges the undesirable byproducts of combustion and foreign matter from the crankcase, before they are likely ingested into engine crankcase oils. This creates a cleaner dirt- and acid-free lubricant and environment. Emissions are purged from the crankcase into separator vessel 230. The flow is thus directed through an enlarged conduit, accelerated and passed through the separator, wherein crankcase emission pressure is reduced by the addition of external cubic capacity afforded by vessel 230 and contaminants are separated by condensing and by induced vortex activity, by pressure and temperature differential separation, expansion, collision, induced fractionation, kinetic impingement and induced entrainment. The heavy hydrocarbons and foreign matter are drained from the separator into a separate gravity collector. The lighter hydrocarbons and volatiles derived from the crankcase emissions are rendered cleaner as a result of this overall process. These cleansed hydrocarbons and volatiles comprise a more sophisticated fuel which is now passed via a conduit advantageously to the downstream side of the throttle valve ahead of the intake manifold.

This is all accomplished in what is essentially a sealed system that draws in no outside uncalibrated air.

The above-described embodiments of the present invention are meant to be illustrative of preferred embodiments of the present invention and are not intended to limit the scope of the present invention. Various modifications, which would be readily apparent to one skilled in the art, are intended to be within the scope of the present invention. The only limitations to the scope of the present invention are set out in the following appended claims.

What is claimed is:

1. An apparatus for drawing fluid into the intake manifold of an internal combustion engine, comprising:

outlet means for the flow of said fluid into said manifold; and means associated with said outlet extending into said manifold to create a zone of low pressure downstream of said means that draws said fluid into said zone and thence said manifold wherein said fluid comprises treated emissions from said engine's crankcase.

2. The apparatus of claim 1 wherein said means comprise a projection extending at least partially into said manifold.

3. The apparatus of claim 2 wherein said projection is situated, in whole or in part, upstream of said outlet.

4. The apparatus of claim 1 wherein said outlet is formed to be flush with an internal surface of said manifold.

5. The apparatus of claim 1 wherein said treated emissions have been treated to remove non-gaseous contaminants therefrom.

6. A method of drawing a fluid into the intake manifold of a internal combustion engine, comprising the steps of:

providing an outlet into said manifold for the discharge of said fluid thereinto; creating a zone of relatively low pressure immediately downstream of said outlet; and using said zone of low pressure to draw fluid from said outlet into said manifold wherein said fluid comprises treated emissions from said engine's crankcase.

7. The method of claim 6 wherein said treated emissions have been treated to remove non-gaseous contaminants therefrom.

8. The method of claim 6 wherein said zone of relatively low pressure is created my means of a projection extending at least partially into said manifold.

9. The method of claim 8 wherein said projection is situated, in whole or in part, upstream of said outlet.

* * * * *